United States Patent Office 3,562,208
Patented Feb. 9, 1971

3,562,208
**ADDITIVES FOR REDUCING THE INFLAMMA-
BILITY OF HIGH ORGANIC POLYMERS**
Hans-Joachim Kötzsch, Rheinfelden, and Egon Bierwirth,
Oberlar, Germany, assignors to Dynamit Nobel Aktiengesellschaft, Troisdorf, Germany, a corporation of
Germany
No Drawing. Filed June 18, 1968, Ser. No. 737,867
Claims priority, application Germany, June 30, 1967,
D 53,484
Int. Cl. C08c 27/64; C08d 11/64; C08f 45/62
U.S. Cl. 260—45.75                            5 Claims

ABSTRACT OF THE DISCLOSURE

Flame retardants for incorporation into high organic polymers comprising products obtained by a Diels-Alder synthesis from hexachlorocyclopentadiene and a vinyl, allyl or methallyl ester or the corresponding mixed esters of bivalent to tetravalent carboxylic acids and the resultant improved polymer products.

---

This invention relates to high organic polymers of reduced inflammability. More particularly this invention relates to high organic polymers having incorporated therein a Diels-Alder addition product of hexachlorocyclopentadiene and a vinyl, allyl or methallyl ester or the corresponding mixed esters of bivalent to tetravalent acids as a flame retardant.

The combustibility of most high organic polymers is an obstacle to their use in a number of applications. Areas in which fire safety must be assured are, for example, the building industry, the mining industry, and the electrical industry. Therefore, many attempts have been made to render ordinarily combustible plastics fireproof.

For example, chlorinated hydrocarbons together with salts of metals of the fifth group of the periodic system have been used as fire-retardant additives. Such mixtures, however, have a tendency towards thermal decomposition reactions at the high manufacturing temperatures usually used, and this has an adverse effect on the mechanical qualities of the finished products. This disadvantage cannot be remedied even by the use of esters prepared by reaction of halogenated phenols with organic acids, since at the fairly high temperatures required for the forming or hardening of a number of plastics, these compounds form hydrogen chloride or hydrogen bromide which are harmful to the mechanical and optical properties of the plastic, depending on the same time during which the high temperature must be maintained.

Other fireproofing agents, such as aromatic or aromatic-aliphatic ethers which are chlorinated or brominated on the aromatic nucleus, or anilines brominated on the aromatic nucleus, which, in combination with antimonium troixide, are used particularly with polyolefins, tend to sweat out in storage forming efflorescenses on the self-extinguishing molding compounds manufactured therewith.

In order to reduce the inflammability of homopolymers and copolymers of styrene, butadiene or acrylonitrile, it has also been proposed to use m- and p-bis-(1,4,5,6,7,7-hexachlorobicyclo-(2,2,1)-5-heptene-2-yl)-benzene. These products do not give rise to any problems due to decomposition reactions at the high temperatures in the manufacturing process. However, they are not very compatible with the polymers.

Additives made with antimony compounds, especially antimony trioxide, play an important part in the preparation of mixtures having a low flammability. However, these antimony compounds are not effective by themselves, but only in combination with substances containing halogen. The flame-retardant action of antimony trioxide is based on its reaction with the hydrohalic acid liberated in the thermal decomposition of the halogen-containing product with various reactions taking place which result in the retardation or extinction of the flame.

It is therefore an object of this invention to provide a novel flame retardant agent.

Another object is to provide a novel polymer composition of reduced inflammability.

Other and additional objects of this invention will become apparent from considering this entire specification including the claims thereof.

In accord with and fulfilling these objects, one aspect of this invention resides in the use, as a fire retardant suited for admixing with polymers, of a compound obtained by a Diels-Alder synthesis from hexachlorocyclopentadiene and a vinyl, allyl or methyl ester or with a corresponding mixed ester of a bivalent to tetravalent carboxylic acid. The aforesaid saturated esters used in the Diels-Alder synthesis may also contain halogen atoms. Another aspect of the invention lies in the high organic polymers of reduced inflammability prepared by incorporating into such polymers from 1 to 40% by weight and preferably 10 to 30% by weight of such compound. The foregoing quantities are based on the high organic polymer present and does not include any additional additives which may also be present.

The compounds as above described are suitable for reducing the inflammability of most highly polymerized materials. Their use is particularly effective with materials which have been produced by the polymerization of unsaturated compounds, particularly of olefins, such as polyethylene, polypropylene, polystyrene, and copolymers thereof, also in combination with acrylonitrile and diolefins, and cross-linkable butadiene-styrene polymers. Additionally, natural and synthetic rubber compounds can be effectively rendered flame-proof in this manner. Polymers based on diolefins (homopolymers and copolymers) including the stereospecific types can also be mentioned in this connection.

The molding compounds rendered flame-proof according to the invention can contain the conventional additives customarily used in polymer chemistry, such as plasticizers, lubricants, fillers, heat and light stabilizers, etc. If desired, the fire-retardant agents to be used according to the invention can be combined with other fire-retardant agents, such as chloroparaffins.

The high chlorine content compounds that are used according to the invention are easy to prepare in a known manner, and is not claimed herein, by a Diels-Alder hynthesis from hexachlorocyclopentadiene and the above-named vinyl, allyl or methylallyl esters in Chemical Abstracts 59 (1963), page 5064. The esters used in the reaction with the hexachlorocyclopentadiene are, for example, the vinyl, allyl or methylallyl esters of aromatic and cycloaliphatic carboxylic acids exemplified by the following: 3 phthalic acids, hexahydrophthalic acids, tetrahalogenated phthalic acids, trimesinic acid, trimellitic acid, pyromellitic acid and the like. In addition the corresponding unsaturated esters of the following aliphatic acids are also suitable as starting substances for the synthesis of the flame-retardant substances: oxalic acid, malonic acid, succinic acid, alpha-chlorosuccinic acid, tetrachlorosuccinic acid, glutaric acid, adipic acid, tartaric acid, mesoxalic acid, citric acid, acetone dicarboxylic acid, etc.

It can be seen that from the above listing of the esters used and the following examples, the Diels-Adler addition products of concern have the general formula:

(X)

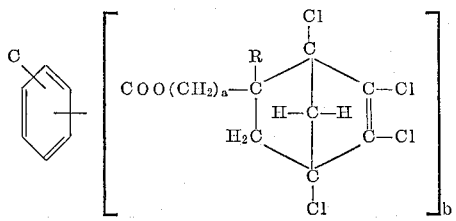

wherein:

R is H or —CH$_3$

X if present is a halogen, preferably —Cl $a$ is 0 or 1

$b$ is 2, 3 or 4

$c$ is 0, 2 or 4

The prior art methods, such as those involving the use of acid catalysts, can be employed in the esterification of the above-named acids with vinyl, allyl or methylallyl alcohol. However, these esters can also be prepared by reaction of the vinyl, allyl and methylallyl halides and the acids.

The flame-retardant compounds used according to the invention can also be synthesized by the following modified method: In a first stage a Diels-Adler reaction is carried out between hexachlorocyclopentadiene and, for example, vinyl or allyl alcohol. In a second stage the alcohol thus produced is esterified with one of the above-named polyvalent acids in the known manner. The molar ratio used in this case is to be such that no free carboxyl groups are left over.

It is also possible for the compounds to be used according to the invention to be those in which free carboxyl groups are still present. The best results as regards the flame-retardant action, however, are achieved when those addition products are incorporated into the high polymers in which all of the carboxyl groups are esterified with the above-named unsaturated alcohols.

The additives used according to the invention have, in comparison with chlorinated hydrocarbons, organic acid esters of halogenphenols and other such substances, the advantage of improved temperature stability against the spiltting off of HCl. Therefore no difficulties arise in this regard when the substances of the invention are used, even when the manufacturing is done at relatively high temperatures.

On account of this special behavior of the fire-retardant agents according, as regards temperature variations, additional thermal stabilization is generally unnecessary. High polymers in whose manufacture very high temperatures are necessary can, if desired, have the usual heat stabilizers and antioxidants added to them. The customary stabilizers and high-polymer additives, such as agents to protect them against light, and lubricants and the like, can be additionally used.

On the other hand, these additives differ advantageously from the previously mentioned m- and p-bis-(1,4,5,6,7,7-hexachlorobicyclo-(2,2,1)-5-heptene-2-yl)-benzene as regards temperature stability. While the latter compounds are very stable substances under temperature stresses, the substances used according to the invention decompose at lower temperatures. On the one hand they are thermally stable enough to prevent trouble in the manufacturing process due to the splitting off of HCl, but on the other hand they are thermally unstable enough to decompose precisely in the temperature range that occurs in the combustion of the high polymer, and release the chlorine that acts to extinguish the flame.

As an additional advantage of the fire-retardant additives to be used according to the invention, it is to be stressed that the amount needed to achieve a certain fire-retardant effect is smaller than it is in the case of the last-named flame-proofing agent of the prior art.

In contrast to the last-named additives of the prior art, the additives according to the invention offer the additional advantage of good compatibility with high polymers, especially with the olefin polymers in the broader sense.

The incorporation of the flame-retardant additives, together, if desired, with other additives, can be performed by prior art methods, as for example in a kneader, on a roller mill, and by mixing and granulating them on extruders.

To test the mixtures for flame resistance, they were plasticized on the roller mill and pressed into sheets 2 mm. thick. From these sheets were cut strips measuring 100 x 10 x 2 mm., which were subjected to a burning test. For this purpose the strips were fastened to a stand and a non-luminous gas flame 4 cm. high was played against the bottom end in such a manner that the bottom end of the specimen extended 1.5 cm. into the cone of the flame. After the flame was removed the afterburning of the specimen was timed to the point of extinction. The flame resistance was also confirmed by testing according to VDE standards (VDE Standard 0472).

The following examples are illustrative but not limitative of the present invention.

EXAMPLE 1

72.5 parts of polypropylene, 20 parts of a Diels-Alder addition product prepared from 1 mol of trimesinic acid triallyl ester and 3 mols of hexachlorocyclopentadiene having the following structural formula:

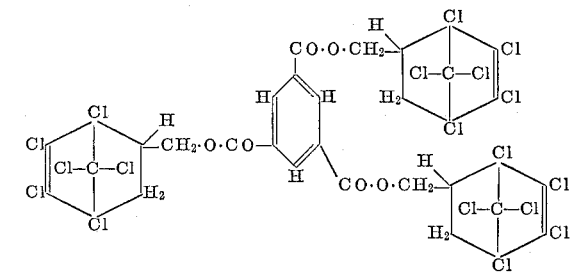

and 7.5 parts of antimony trioxide were plastified at about 170–180° C. on a roller mixer. The mixture thus prepared was then pressed to form a sheet 2 mm. thick. 10 strips measuring 200 x 10 x 2 mm. were stamped from this sheet and subjected to the flame test described above. Of 10 specimens, the flame went out immediately upon the removal of the burner from 2 of them; in 5, it went out within 2 seconds, and in 3 within 5 seconds. Flame-resistance was established by testing according to procedure VDE 0472.

The flame-retardant ester as used in Example 1 was prepared in the conventional manner as follows:

(a) Preparation of trimesinic acid triallyl ester 210 g. (1 mol) of trimesinic acid and 190 g. of allyl alcohol were boiled in a dehydrator under refluxing in 1.5 liters of benzene with the addition of 5 ml. of p-toluenesulfonic acid. After 12 hours, 3 mols of water had been separated. Following another 3 hours of boiling, during which some more water passed over, the solution was washed with water, then with saturated soda solution, and again with water. 308 g. (94%) of trimesinic acid triallyl ester were isolated, BP$_3$ 182–4° C.

*Analysis* for $C_{18}H_{18}O_6$—calculated (percent): C, 65.48; H, 5.46%. Found (percent): C, 65.61; H, 5.45.

(b) Preparation of the flame-retardant Diels-Alder addition product 110 g. of trimesinic acid triallyl ester and 273 g. of hexachlorocyclopentadiene were mixed together and the mixture heated at 160° C. for 18 hours. Upon cooling, the content of the flask hardened to an amorphous solid product which could be used directly as a flameproofing agent without further purification. 10 g. of the raw product were dissolved in 20 ml. of hot xylene and the volatile components were distilled off in a rotary vacuum distilling apparatus, 9.7 g. of purified product were thereby obtained having a softening range of 114–9° C.

*Analysis* for $C_{33}H_{18}Cl_{18}O_6$—calculated (percent): C, 34.52; H, 1.56; Cl, 55.66. Found (percent): C, 34.71; H, 1.69; Cl, 55.35.

EXAMPLE 2

84 parts of polystyrene, 12 parts of a Diels-Alder addition product prepared from 1 mol of trimellitic acid triallyl ester and 3 mols of hexachlorocyclopentadiene, together was 4 parts of antimony trioxide were worked into a sheet at 165° C. as described in Example 1. The samples obtained as set out in Example 1, were subjected to the flame test. When the burner was removed, the flame went out in 6 of the 10 strips immediately and within 2 seconds in 4 of them.

EXAMPLE 3

80 parts of low-pressure polyethylene, 5 parts of antimony trioxide and 15 parts of a Diels-Alder addition product prepared from 1 mol of pyromellitic acid tetraallyl ester and 4 mols of hexachlorocyclopentadiene were worked into a sheet and tested at 140° C. as described in Example 1. When the burner was removed the flame went out in 7 of the 10 strips immediately and within 2 seconds in 3 of them.

EXAMPLE 4

72.5 parts of polypropylene, 7.5 parts of antimony trioxide and 20 parts of a Diels-Alder addition product prepared from 1 mol of oxalic acid diallyl ester and 2 mols of hexachlorocyclopentadiene were made into a sheet at 160° C. and further tested as in Example 1. When the burner was removed, the flame went out in 3 of the 10 strips immediately and in 7 within 3 seconds. The material was further found to be flame-resistant according to VDE 0472.

EXAMPLE 5

The product produced from 65 parts of polyvinyl chloride, 19.5 parts of diethylhexylphthalate, 5.5 parts of antimony trioxide and 10 parts of a Diels-Alder addition product prepared from 1 mol of diallyl succinate and 2 mols of hexachlorocyclopentadiene was formed into sheets at 160° C. as in Example 1. When subjected to the flame test the flame went out immediately after the burner was removed in all 10 test strips. The strips were also found to be flame-resistant according to VDE 0472.

EXAMPLE 6

78 parts of high-pressure polyethylene, 5 parts of antimony trioxide and 17 parts of a Diels-Alder addition product prepared from 1 mol of o-phthalic acid diallyl ester and 2 mols of hexachlorocyclopentadiene were formed into a sheet at 130° C. as in the foregoing examples. When the burner was removed, from the strips, the flame went out in 5 out of 10 strips within one second, and in the other 5 within 4 seconds.

We claim:

1. A composition comprising an admixture of a polymer selected from the group consisting of natural rubber and a polyolefin and in the range of 1 to 40 weight percent of a Diels-Alder addition product of hexachlorocyclopentadiene having the formula:

(X) 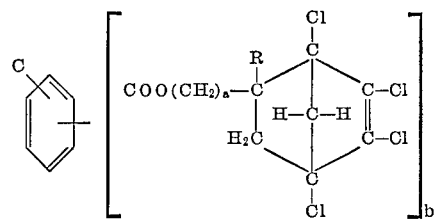

wherein:

R is H or —$CH_3$
is preset is a haloge
$a$ is 0 or 1
$b$ is 2, 3 or 4
$c$ is 0, 2 or 4

2. The composition of claim 1 comprising in addition in the admixture in the range of 1 to 20 weight percent of antimony oxide as an additional fire retardant.

3. The composition of claim 1 wherein said polyolefin is a polymer of an olefin selected from the group consisting of propylene, styrene and ethylene.

4. The composition of claim 1 wherein said addition product is formed by the reaction of said hexachlorocyclopentadiene with a member selected from the group consisting of trimesinic acid triallyl ester, trimellitic acid triallyl ester, pyromellitic acid tetraalyl ester, and o-phthalic acid diallyl ester.

5. The composition of claim 1 wherein:

R is H
$a$ is 1
$b$ is 3
$c$ is 0

References Cited

UNITED STATES PATENTS 3,382,204  5/1968  Gouinlock _____ 260—33.8
3,418,364  12/1968 Mark _____ 260—485
3,437,682  4/1969  Finnamore _____ 260—475

DONALD E. CZAJA, Primary Examiner

V. P. HOKE, Assistant Examiner

U.S. Cl. X.R.

252—8.1; 260—2.5, 45.85, 475, 814

PO-1050
(5/69)

UNITED STATES PATENT OFFICE
CERTIFICATE OF CORRECTION

Patent No. __3,562,208__                    Dated __Feb. 9, 1971__

Inventor(s) __Hans-Joachim Kotzsch, et al.__

It is certified that error appears in the above-identified pa
and that said Letters Patent are hereby corrected as shown below:

Col. 1, line 51, delete the word "same" before "time".

Col. 2, line 25, change "methyl" to --methallyl-

Col. 2, line 59, change "hynthesis" to --synthe

Col. 6, line 28, change "is preset is a haloge" substitute therefor --X if present is a halogen --.

Col. 3 and col. 6, the structural formula, "(X) should be shown alongside the adjacent "C".

Signed and sealed this 18th day of January 1972.

(SEAL)
Attest:

EDWARD M. FLETCHER, JR.        ROBERT GOTTSCHALK
Attesting Officer            Acting Commissioner of Patent